United States Patent
Schnitzer

(10) Patent No.: US 8,539,855 B2
(45) Date of Patent: Sep. 24, 2013

(54) STEERING COLUMN FOR A MOTOR VEHICLE

(75) Inventor: Rony Schnitzer, Ruggell (CH)

(73) Assignee: ThyssenKrupp Presta Aktiengesellschaft, Eschen (LI)

( * ) Notice: Subject to any disclaimer, the term of this patent is extended or adjusted under 35 U.S.C. 154(b) by 324 days.

(21) Appl. No.: 13/139,368

(22) PCT Filed: Nov. 20, 2009

(86) PCT No.: PCT/EP2009/008270
§ 371 (c)(1),
(2), (4) Date: Jun. 13, 2011

(87) PCT Pub. No.: WO2010/069448
PCT Pub. Date: Jun. 24, 2010

(65) Prior Publication Data
US 2011/0239808 A1  Oct. 6, 2011

(30) Foreign Application Priority Data
Dec. 18, 2008  (DE) .......................... 10 2008 062 706

(51) Int. Cl.
*B62D 1/16* (2006.01)
(52) U.S. Cl.
USPC ................. 74/493; 74/492; 280/775; 280/777
(58) Field of Classification Search
USPC ............................ 74/492, 493; 280/775, 777
See application file for complete search history.

(56) References Cited

U.S. PATENT DOCUMENTS

| 5,131,286 A | 7/1992 | Sturges et al. |
| 5,240,284 A * | 8/1993 | Takada et al. ................. 280/775 |

(Continued)

FOREIGN PATENT DOCUMENTS

| DE | 692 07 218 | 8/1996 |
| DE | 100 007 145 | 8/2000 |

(Continued)

OTHER PUBLICATIONS

International Search Report issued Mar. 3, 2010 in International (PCT) Application No. PCT/EP2009/008270.

*Primary Examiner* — David M Fenstermacher
(74) *Attorney, Agent, or Firm* — Wenderoth, Lind & Ponack, L.L.P.

(57) ABSTRACT

A adjustable steering column for a motor vehicle includes a mounting part that can be attached to the chassis of the motor vehicle, and an adjusting part that can be adjusted relative to the mounting part. The adjusting part rotatably supports a segment of the steering spindle, and the segment is adjacent to a steering wheel side end of the steering spindle that can be adjusted relative to the mounting part between a first end position and a second end position, along an adjusting path, when adjusting the adjusting part. The steering-wheel side end is adjusted through at least part of the adjusting path in a coupled manner in one direction of a length adjustment of the steering column, and in one direction of a height or tilt adjustment of the steering column. A front guide pin is mounted at the adjusting part or on the mounting part, and the pin engages in at least one elongated hole provided in the other of the two parts. A rear guide pin is further mounted on the adjusting part or the mounting part, and the pin includes a greater distance than the front guide pin from the steering-wheel side end of the steering spindle, and engaging in a rear elongated hole provided in at least one other of said two parts, the course thereof, relative to the curvature thereof and/or the direction of extension thereof differs from the corresponding course of the at least one front elongated hole over at least one segment of the extension thereof.

15 Claims, 4 Drawing Sheets

(56) References Cited

U.S. PATENT DOCUMENTS

| | | | |
|---|---|---|---|
| 5,320,384 A * | 6/1994 | Arnold et al. | 280/777 |
| 5,595,399 A * | 1/1997 | Fouquet et al. | 280/777 |
| 6,189,405 B1 | 2/2001 | Yazane | |
| 6,290,258 B1 | 9/2001 | Parkinson et al. | |
| 6,378,903 B1 | 4/2002 | Yabutsuka et al. | |
| 6,523,432 B1 * | 2/2003 | Yamamoto et al. | 74/492 |
| 6,543,807 B2 * | 4/2003 | Fujiu et al. | 280/775 |
| 6,685,225 B2 * | 2/2004 | Hancock et al. | 280/777 |
| 7,228,754 B2 * | 6/2007 | Matsumiya | 74/493 |
| 7,328,631 B2 * | 2/2008 | Murakami et al. | 74/493 |
| 7,661,711 B2 * | 2/2010 | Menjak et al. | 280/777 |
| 7,810,408 B2 * | 10/2010 | Okamoto et al. | 74/493 |
| 7,992,899 B2 * | 8/2011 | Kirihara et al. | 280/775 |
| 8,430,428 B2 * | 4/2013 | Tinnin | 280/779 |
| 2007/0069513 A1 | 3/2007 | Kirihara et al. | |

FOREIGN PATENT DOCUMENTS

| | | |
|---|---|---|
| DE | 10 2004 011 657 | 9/2005 |
| DE | 10 2005 007 907 | 8/2006 |
| EP | 0 121 506 | 10/1984 |
| EP | 0 440 698 | 8/1991 |
| EP | 0 497 262 | 8/1992 |
| EP | 0 671 308 | 9/1995 |
| EP | 0 782 951 | 7/1997 |
| EP | 0 849 141 | 6/1998 |
| EP | 1 364 856 | 11/2003 |
| GB | 2 244 032 | 11/1991 |
| GB | 2 350 329 | 11/2000 |
| JP | 60-193762 | 10/1985 |
| WO | 2005/087570 | 9/2005 |

* cited by examiner

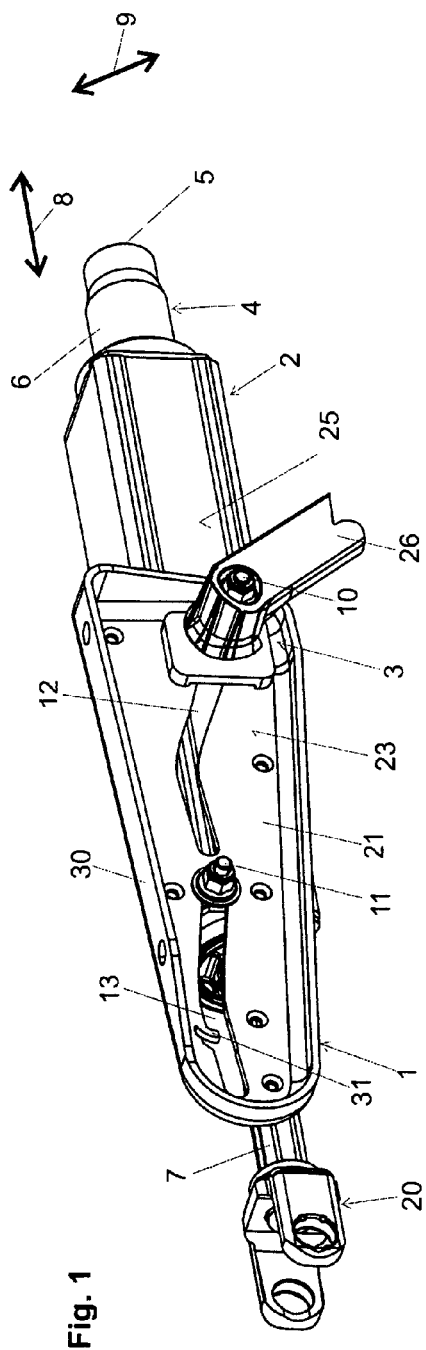
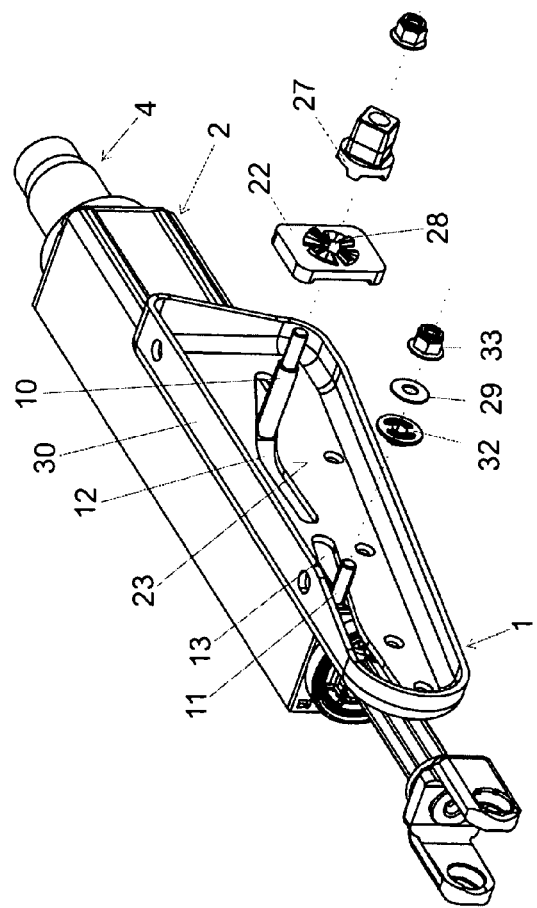
Fig. 1
Fig. 2

STEERING COLUMN FOR A MOTOR VEHICLE

BACKGROUND OF THE INVENTION

The invention relates to an adjustable steering column for a motor vehicle with a mounting unit, securable in position on the chassis of the motor vehicle, and a setting unit adjustable with respect to the mounting unit. The setting unit rotatably bearing supports a section of the steering spindle, which section adjoins a steering wheel-side end of the steering spindle, which end, during the displacement of the setting unit with respect to the mounting unit, is displaceable between a first end position and a second end position over a setting path. At least coupled over a portion of the setting path, a displacement of the steering wheel-side end takes place in a direction of a length adjustment of the steering column and in a direction of a height or inclination adjustment of the steering column. On the setting unit or on the mounting unit a frontward guide bolt is secured which engages into at least one frontward elongated hole provided in the other of these two units.

Adjustable steering columns are known in various embodiments. The adjustability of the steering column in order to adjust the position of the steering wheel represents a convenience function for the driver.

Apart from length-adjustable steering columns and steering columns only inclination or height adjustable, steering columns length as well as also height or inclination adjustable are also known.

Steering columns length adjustable as well as also inclination or height adjustable are disclosed, for example, in EP 1 364 856 A1. A clamp bolt of a securement device, with which the set position of the steering column can be arrested, penetrates crossing elongated holes in a chassis-stationary mounting unit and in a setting unit adjustable for setting the position of the steering column with respect to it, which setting unit rotatably bearing supports a section of the steering spindle. During the adjustment of the inclination or height, the clamp bolt is displaced in elongated holes extending in this direction. The setting unit is swivelled about an axle bolt which is further removed from the steering wheel-side end of the steering spindle than the clamp bolt. In order to permit the length adjustment of the steering spindle, the chassis-stationary axle bolt is guided such that it is displaceable in elongated holes of the setting unit which extend parallel to the axis of the steering spindle and are located parallel to the elongated holes in the setting unit penetrated by the clamp bolt and serve for the length adjustment. Setting the length and the inclination or height can herein be carried out independently of one another.

A similar design is also disclosed in U.S. Pat. No. 6,189, 405 B1. Here the bolt, further removed from the steering wheel-side end, is guided such that it is displaceable in elongated holes in the setting unit parallel to the longitudinal axis of the steering spindle as well as also in elongated holes extending at right angles thereto in the chassis-stationary mounting unit. This bolt represents a clamp bolt of a further securement device, which device is coupled with the securement device, of which the clamp bolt, further removed from the steering wheel-side, is a part. Through this design, which however is rather complex, additional adjustment feasibilities of the steering wheel result.

EP 0 671 308 B1 and EP 0 440 698 B1 furthermore disclose so-called "head tilt" steering columns. The axle bolt, about which the swivel axis of the height or inclination adjustment takes place, is here located closer to the steering wheel-side end than the clamp bolt, whereby a large setting range for the height or inclination adjustment results. The steering wheel can hereby be swivelled away upwardly when getting into or out of the car. Due to the proximity of the swivel axis to the steering wheel, the plane in which the steering wheel is located herein changes markedly in the height or inclination adjustment.

A similar steering column is also disclosed in EP 121 506 B1. However, here the chassis-stationary mounting unit includes a larger window clearance in which the clamp bolt can be moved freely in order to carry out the length adjustment and the height or inclination adjustment.

A steering column of the type described in the introduction is disclosed in DE 10 2004 011 657 A1. The length adjustment and the height or inclination adjustment are executed under coupling. For this purpose, a guide bolt attached on the setting unit engages into an elongated curved hole extending in the mounting unit. The inclination or height adjustment takes place about an axle bolt, over which a bearing sleeve is swivellably bearing supported with respect to the mounting unit. The bearing sleeve, in turn, supports the steering spindle in a region further removed from the steering wheel-side end than the region supported by the setting unit.

SUMMARY OF THE INVENTION

The present invention addresses the problem of providing a simply implemented steering column of the type described in the introduction, in which expanded feasibilities are provided for the specifying of the possible setting positions of the steering column. This is achieved according to the invention through a steering column with the features described below.

In the steering column of the invention, on the setting unit or on the mounting unit a rearward guide bolt is secured, which has a greater distance than the frontward guide bolt from the steering wheel-side end of the steering spindle and which engages into at least one rearward elongated hole provided in the mounting unit or setting unit. The course of the rearward elongated hole differs, at least over a section of its reach, from the corresponding course of the at least one frontward elongated hole, wherein the courses differ in curvature and/or direction of their reach.

Through the guidance of the guide bolts in the elongated holes a single (unique) setting path results, wherein each position on the setting path corresponds to a unique position of the setting unit or of the steering wheel-side end of the steering spindle. The displacement herein takes place not only either in the direction of the length adjustment or in the direction of the inclination or height adjustment, but rather, at least over a portion of the setting path, coupled (simultaneously) in the direction of the length adjustment as well as also of the inclination or height adjustment.

Through the implementation according to the invention, through an appropriate implementation of the courses of the elongated holes, expanded feasibilities are provided for a desired setting characteristic over the displacement path. In particular, over a portion of the displacement path or over the entire displacement path, the steering wheel-side end of the steering spindle can move in the direction of the length adjustment of the steering column and simultaneously about a virtual rotational axis, which has a greater distance from the steering wheel-side end of the steering spindle than the rearward guide bolt. It is herein preferred to place the virtual rotational axis into that region in which is located the universal joint which connects the section of the steering spindle adjoining the steering wheel-side end with a further section of the steering spindle. In the adjustment of the steering column, this universal joint thus remains essentially in the same position. Bearing elements for the steering spindle in the proximity of the universal joint are herein not required.

Through a relatively large distance of the virtual rotational axis from the steering wheel-side end, a minimal change of the plane of the steering wheel in its height adjustment can also be attained.

It is also conceivable and feasible for the position of the virtual rotational axis to change over the setting path.

The course of the at least one rearward elongated hole preferably differs from the course of the at least one frontward elongated hole over at least one third of the displacement path, thus at least over a third of the sections of these elongated holes traversed by the guide bolts over the displacement path.

Advantageously, at least one section of the at least one frontward elongated hole, which section preferably extends over at least one third of the dimension of the frontward elongated hole over which the guide bolt is shifted over the setting path, is curved and/or extends in a direction which is slanted with respect to the direction of the length adjustment, as well as also with respect to the direction of the height or inclination adjustment.

Advantageously, at least one section of the at least one rearward elongated hole, which preferably extends over at least one third of the dimension of the rearward elongated holes over which the guide bolt is shifted over the setting path, is curved and/or extends in a direction which is slanted with respect to the direction of the length adjustment as well as also with respect to the direction of the height or inclination adjustment.

The set position of the steering column can be fixed by means of a securement device, and the securement can take place in a conventional manner through elements cooperating under frictional closure and/or under form closure. The mounting unit preferably comprises at least one side jaw extending next to the setting unit, which side jaw in the closed state of the securement device is pressed onto one side wall of the setting unit. The elongated holes can herein be advantageously disposed in one of the two parts pressed onto one another, especially preferred is its disposition in the side jaw.

Apart from the implementation in which the mounting unit includes only on one side of the setting unit a side jaw carrying the setting unit, an implementation is also conceivable and feasible in which the mounting unit includes side jaws located on both sides of the setting unit. These side jaws in the closed state of the securement device are pressed on both sides onto the setting unit. In the latter case, for example, frontward and rearward guide bolts, secured on the setting unit, can be provided by which sections projecting from both sides of the setting unit are each guided in one elongated hole of the particular side jaw. Instead of end-to-end frontward and rearward guide bolts, on both sides on the setting unit and/or on the particular side jaw one frontward and on both sides on the setting unit and/or on both sides on the particular side jaws, one rearward guide bolt can also be disposed, and the guide bolt projects into the particular elongated hole of the side jaw and/or of the setting unit. A combination of these implementations, for example one end-to-end frontward guide bolt and separate rearward guide bolts or conversely, is also conceivable and feasible.

In an advantageous embodiment of the invention on the frontward guide bolt, at least one securement element of the securement device is disposed. In the closed state of the securement device, this securement element cooperates with a countersecurement element, and the countersecurement element is nondisplaceable with respect to the mounting unit in the direction of the length adjustment as well as also in the direction of the height or inclination adjustment, and preferably represents a part of the mounting unit. During the opening and closing of the securement device, the securement element is preferably displaced in the direction of the longitudinal axis of the frontward guide bolt in order to come out of engagement and into engagement with the countersecurement element. For this purpose, for example, a cam disk can be provided which cooperates with a connection link disk, wherein one of the disks is turned from position during the opening and closing of the securement device.

An advantageous embodiment provides that, adjoining that end of the setting path at which the steering spindle has its least length, is a crash path over which the frontward and the rearward guide bolts are dislocatable in crash sections of the frontward and the rearward elongated holes. These crash sections of the elongated holes thus adjoin the setting sections of the elongated holes over which the guide bolts are displaceable over the setting path.

Herein, advantageously, at least over a portion of the crash path acts an energy absorption mechanism through which energy is dissipated, apart from the energy which is dissipated through the overcoming of the holding forces of the securement device. This energy absorption mechanism can, for example, be implemented such that the dislocation of the frontward guide bolt over the crash section of the at least one frontward elongated hole and/or the dislocation of the rearward guide bolt over the crash section of the at least one rearward elongated hole takes place with the consumption of energy, for example, so that the elongated hole is widened by the guide bolt. Other energy absorption mechanisms are also conceivable and feasible, for example, so that at the end of the setting path the setting unit or a part connected hereto comes into engagement with an energy absorption element secured on the mounting unit or a part connected herewith, for example a bending strip or a tear strip.

Between the setting section and the crash section of the at least one frontward and/or of the at least one rearward elongated hole there is preferably disposed a stop element, which during normal operation delimits the setting path and which, in the event of a crash, is deformable, in order to unblock the crash path.

A crash event is presumed to have occurred if, onto the steering wheel-side end of the steering spindle, a force acts in the axial direction of the steering spindle, which force exceeds a predetermined limit value. This limit value is preferably at least 500 N. It is preferred that this limit value is maximally 10,000 N, especially preferable maximally 5000 N.

If within the scope of this document the terms "front" and "rear" are used in connection with the steering column, this refers to the sight of the driver. Thus, a further forward part has a lesser distance from the head of the driver in the intended driving position than a further rearward located part.

BRIEF DESCRIPTION OF THE DRAWINGS

Further advantages and details of the invention will be explained in the following with reference to the enclosed drawings, in which:

FIG. 1 is an oblique view of an embodiment of a steering column according to the invention at the end of the setting path, in which the steering spindle has its greatest length (=lengthened-out position);

FIG. 2 is an oblique view from a changed angle of view in an intermediate position of the steering column, parts of the steering column depicted pulled apart from one another (and the actuation lever omitted);

DETAILED DESCRIPTION OF THE INVENTION

Figure 3:
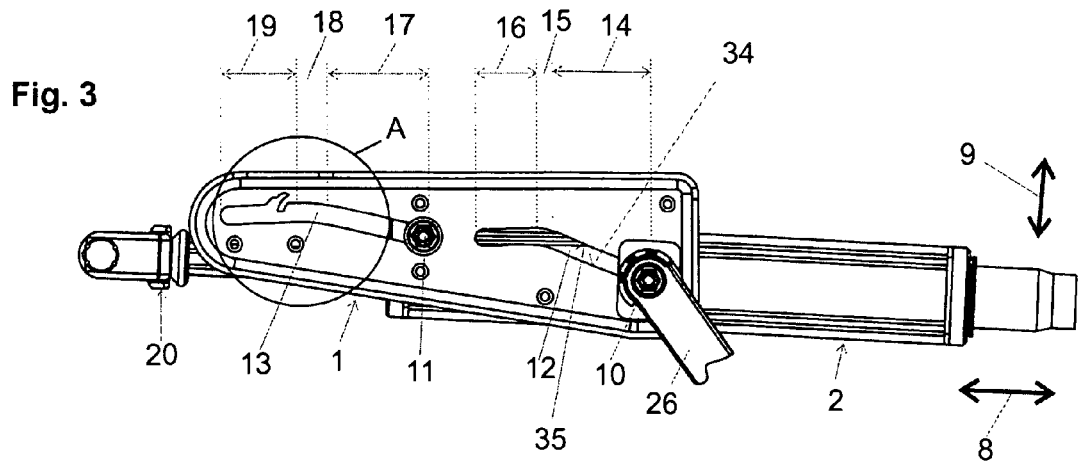
FIG. 3 is a side view of the steering column in the lengthened-out position.
Figure 4:
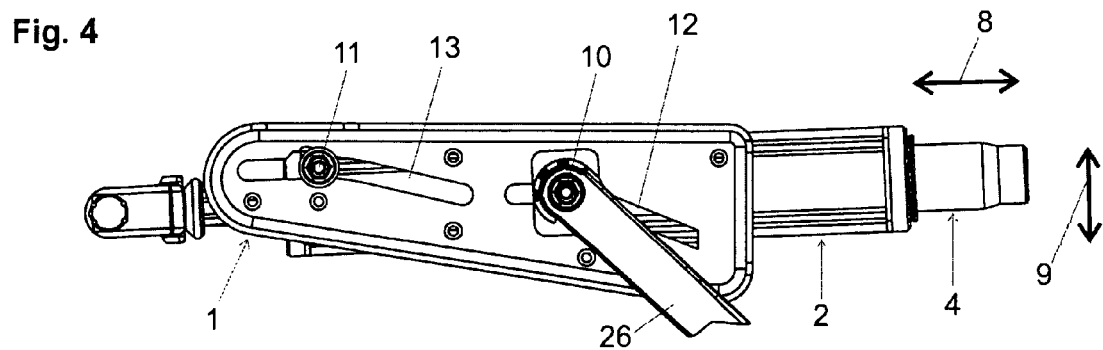
FIG. 4 is a side view of the steering column, wherein the setting unit is located at the end of the setting path in which the steering spindle has its shortest length (=maximally retracted position)
Figure 5:
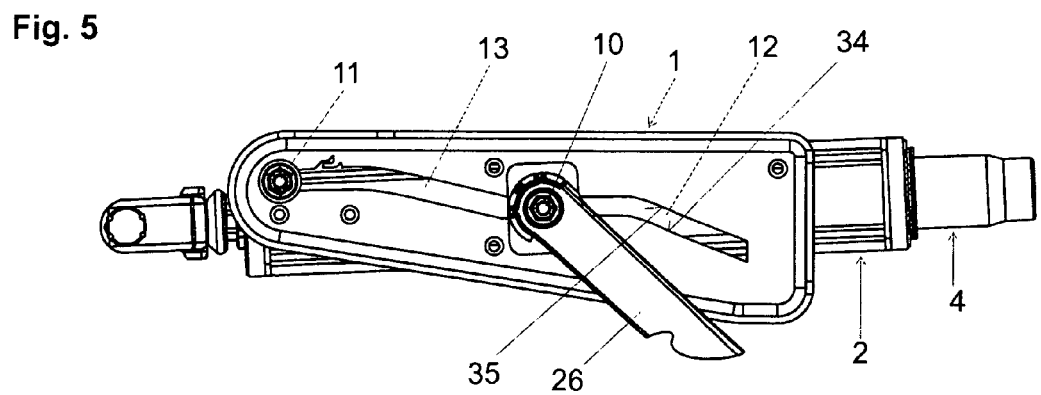
FIGS. 5 and 6 is a side view and an oblique view of the steering column after a vehicle crash.
Figure 6:
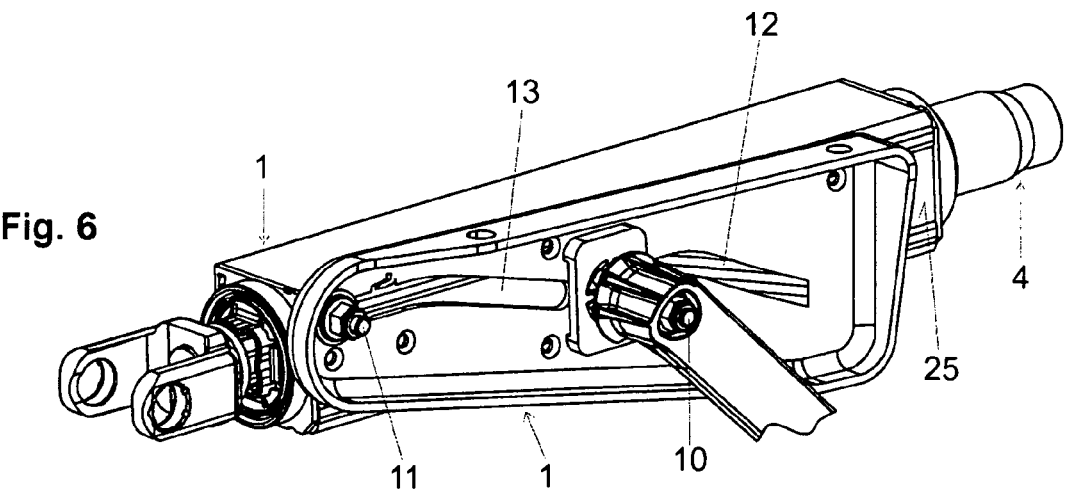
Figure 7:
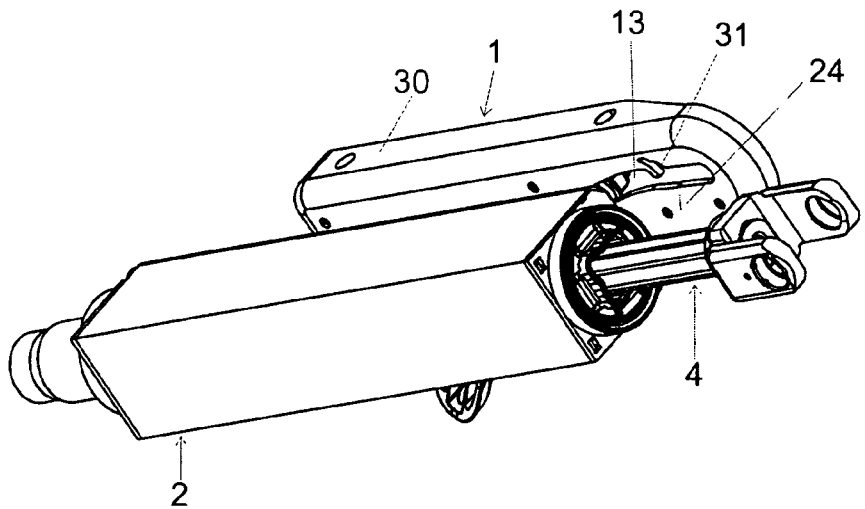
FIG. 7 is an oblique view of the steering column from the opposite side.

An embodiment of the invention is depicted in FIGS. 1 to 7. The steering column comprises a mounting unit 1 to be secured in place on a chassis of the motor vehicle, and a setting unit 2 displaceable with respect thereto in the opened state of a securement device. The setting unit 2 (which can here also be denoted as a jacket unit or a bearing unit) rotatably bearing supports a section of the steering spindle 4, which section adjoins a steering wheel-side end 5 of the steering spindle 4. The section of the steering spindle 4 rotatably supported by setting unit 2 comprises two subsections 6, 7 telescopable parallel and toward one another (the connection region of these is only visible in the embodiment variant of FIG. 8) to permit the length setting of the steering column.

In the opened state of the securement device 3, the setting unit 2 or the steering wheel-side end 5 of the steering spindle 4 is displaceable over a setting path. A combined adjustment of the steering spindle 4 or of the steering wheel-side end 5 of the steering spindle 4 takes place in the direction 8 of the length adjustment and in the direction 9 of the height or inclination adjustment. In every displacement position of the setting unit 2, the direction 8 of the length adjustment lies parallel to the longitudinal axis of the section of the steering spindle 4 adjoining the steering wheel-side end 5, and the direction 9 of the height or inclination adjustment lies in a particular setting position of the setting unit 2 at right angles to the longitudinal axis of the section of the steering spindle 4 adjoining the steering wheel-side end 5.

Direction 9 conventionally represents in passenger vehicles a height adjustment of the steering wheel. In motor vehicles with substantially vertically oriented steering columns, direction 9 would represent an adjustment of the steering column in the direction toward the front of the vehicle or its rear end, wherein the length adjustment here adjusts the height of the steering wheel.

On setting unit 2, a frontward guide bolt 10 and a rearward guide bolt 11 are secured nondisplaceably with respect to the direction 8 of the length adjustment as well as also with respect to the direction 9 of the height or inclination adjustment. In the depicted embodiment, the guide bolts 10, 11 are rigidly connected with the setting unit 2. A shiftability in the direction of their longitudinal axes is conceivable and feasible. The frontward guide bolt 10 projects into a frontward elongated hole 12 implemented in the mounting unit 1, and the rearward guide bolt projects into a rearward elongated hole 13 implemented in mounting unit 1.

The converse configuration is conceivable and feasible in which the elongated holes 12, 13 are implemented in setting unit 2 and the guide bolts 10, 11 are secured in the mounting unit 1.

Through the guidance of the guide bolts 10, 11 in the elongated holes 12, 13, the setting unit 2 or the steering wheel-side end 5 of the steering spindle 4 is guided over the setting path and, specifically, between a first end position, in which the steering spindle 4 has its greatest length, and a second end position, in which the steering spindle 4 has its shortest length. There exists here only a single setting path, e.g. the setting path is unique and each point on the setting path corresponds to a unique position of the steering wheel (not shown in the Figures) attached on the steering wheel-side end 5 of the steering spindle 4.

In the embodiment, the steering wheel-side end 5 of the steering spindle 4 is in the lengthened-out position in its lowest position. When sliding the spindle in the direction toward the maximally retracted position, the steering wheel-side end 5 is additionally displaced upwardly. The fundamental concept here is that a large person moves the seat far back as well as into a low adjustment position, whereas a smaller person moves the seat further forward and higher.

The frontward elongated hole 12 in the embodiment includes, adjoining the first end position of the setting path, an at least approximately straight section 14 (a potential curvature of this section 14 is less than 5°), adjoining a curved section 15. With this curved section 15 ends the setting section permitting the setting path of the frontward elongated hole 12 (a crash section 16 adjoining thereon will be described later). Adjoining the first end position of the setting path, the rearward elongated hole 13 has an at least approximately straight section 17 (a potential curvature of this section 17 is less than 5°), which is adjoined by a curved section 18. With this curved section 18 terminates the setting section, permitting the setting path of the rearward elongated hole 13 (a crash section 19 adjoining thereon will be described later). When the frontward guide bolt 10 is in the straight section 14 of the frontward elongated hole 12, the rearward guide bolt 11 is located in the straight section 17 of the rearward elongated hole 13.

When the frontward guide bolt 10 is in the curved section 15 of the frontward elongated hole 12, the rearward guide bolt 11 is located in the curved section 18 of the rearward elongated hole 13.

For all positions of the setting unit 2 along the setting path, the straight section 14 of the particular frontward elongated hole 12 is at an angle with respect to direction 8 of the length adjustment as well as to direction 9 of the height or inclination adjustment. The angle with respect to direction 8 of the length adjustment, as well as also the angle with respect to direction 9 of the height or inclination adjustment, is for all positions of the setting unit 2 along the setting path at least 10°.

For all positions of the setting unit 2 along the setting path, the straight section 14 of the particular rearward elongated hole 13 is at an angle with respect to direction 8 of the length adjustment as well as to direction 9 of the height or inclination adjustment. The angle with respect to direction 8 of the length adjustment, as well as also the angle with respect to direction 9 of the height or inclination adjustment, for all positions of the setting unit 2 along the setting path is at last 10°.

The course of the rearward elongated hole 13 differs over the sections 17, 18 from the corresponding course of the frontward elongated hole 12 over sections 14, 15. In a comparison of the courses of the elongated holes 12, 13, at issue is the comparison of the particular traversed points simultaneously, on the one hand, by the frontward guide bolt 10, on the other hand, by the rearward guide bolt 13. In the present embodiment, the direction of the reach of the straight section 17 of the rearward elongated hole 13 differs from the direction of the reach of the straight section 14 of the frontward elongated hole 12. Expressed differently, the sections 17, 14 are at angles with respect to one another. Over the curved section 18, the rearward elongated hole 13 can, moreover, compared to the curved section 15 of the frontward elongated hole 12, have a different radius of curvature and—at least partially—have a different direction of the reach, e.g. the tangents of the subsections (=at the location at which the guide bolts 10, 11 come to lie simultaneously) form angles with one another.

The longitudinal axes of the frontward and of the rearward guide bolts 10, 11 are parallel to one another. The rearward guide bolt 10 and the rearward elongated hole 13 have a greater distance from the steering wheel-side end 5 of the steering spindle 4 than the frontward guide bolt 10 and the frontward elongated hole 12.

The longitudinal axes of the guide bolts 10, 11 are at right angles to the longitudinal axis of the section of the steering spindle 4, adjoining the steering wheel-side end, and at right angles to the direction 9 of the height or inclination adjustment.

The longitudinal axes of the guide bolts 10, 11 are preferably horizontal.

In the displacement of the setting unit 2 (and of the steering wheel-side end 5 displaced with the setting unit 2 of the steering spindle 4 over the setting path), a displacement of the setting unit 2 and the steering wheel-side end 5 takes place at least over a large portion of the setting path (at least over the straight sections 14, 17) under coupling (thus simultaneously) in the direction 8 of the length adjustment and in the direction 9 of the height or inclination adjustment. The displacement in direction 9 of the height or inclination adjustment corresponds to a rotation of the setting unit 2 and of the steering wheel-side end 5 about a virtual rotational axis located parallel to the axes of the guide bolts 10, 11, which axis in the depicted embodiment is located at the universal joint 20. The universal joint 20 connects the section of steering spindle 4 (which encompasses the telescopable subsections 6, 7) adjoining the steering wheel-side end 5 with a further section of the steering spindle.

If desired, the virtual rotational axis could also be provided at a different location, wherein a greater distance of the virtual rotational axis from the steering wheel-side end 5 compared to the rearward guide bolt 11 is preferred. The location of the virtual rotational axis can also vary more or less over the setting path.

The mounting unit 1 includes a side jaw 21 extending next to the setting unit 2, which jaw is at right angles to the longitudinal axes of the guide bolts 10, 11 and in which the frontward and rearward elongated holes 12, 13 are disposed. In the depicted embodiment, such side jaw 21 is only provided on one side of the setting unit 2. It would also be conceivable and feasible for the mounting unit 1 to comprise two parallel side jaws located on both sides of the setting unit 2, each of which comprises frontward and rearward elongated holes 12, 13 guiding frontward and rearward guide bolts 10, 11. Preferred would be, viewed in the longitudinal direction of the guide bolts 10, 11, a congruency of the two frontward elongated holes, as well as also of the two rearward elongated holes.

In the closed state of the securement device 3, the side jaw 21 is pressed against the setting unit 2. In the case of an implementation with side jaws disposed bilaterally to the setting unit 2, these would preferably be pressed bilaterally against setting unit 2 in the closed state.

The securement device 3 comprises a securement element 22 disposed on the frontward guide bolt 10 shiftably in the direction of its longitudinal axis. In the closed state of the securement device 3, this securement element 22 cooperates with a countersecurement element of the mounting unit 1 in order to counteract a displacement of the setting unit 2 with respect to the mounting unit 1. This countersecurement element in the depicted embodiment is formed by a region of the outer surface 23 of the side jaw adjacent to the frontward elongated hole 12. The securement element 22 and the countersecurement element herein cooperate under frictional closure. A further frictional closure is formed between the inner surface 24 of side jaw 21 and the side face 25 of the setting unit 2 against which it is pressed in the closed state of the securement device 3.

Instead of elements cooperating under frictional closure for the securement of the setting unit 2 with respect to the mounting unit 1 in the closed state of the securement device 3, elements cooperating under form closure could also be provided. Combinations of elements cooperating under frictional closure and form closure could also be provided. To increase the number of friction faces, lamella cooperating in the manner of a disk pack could also be provided, which are disposed between the securement element 22 and the side jaw 21 and of which every second one is connected with the mounting unit 1 and the interspaced one with the setting unit 2. Such cooperating disk packs are known. For this purpose, the mounting unit 1 and setting unit 2 would have to be appropriately modified.

In the depicted embodiment, an actuation lever 26 for opening and closing the securement device 3 is rotatably disposed on the frontward guide bolt 10. When the actuation lever 26 is turned from position about the axis of the frontward guide bolt 10, a cam disk 27 is entrained by the actuation lever 26, thus turned from position, which cooperates with connection link faces 28, which faces have gradients in order to move the securement element 22 in the axial direction of the frontward guide bolt 10 during the turning from position of the cam disk 27. The link faces 28 in the depicted embodiment are disposed on the cam disk 27, which thus forms a link disk. A separate link disk could also be provided.

Different implementations of securement devices 3 are conceivable and feasible. It would in principle also be conceivable and feasible to dispose the securement device 3 in the proximity of the rearward guide bolt 11, wherein the securement element 22 could be disposed on the rearward guide bolt 11 such that it is shiftable in the direction of the longitudinal axis of the same. During the opening and closing of the securement device, the securement element 22 could be displaced in the axial direction of the rearward guide bolt.

To effect freedom from play in the proximity of the rearward guide bolt, a spring washer 29 is emplaced between the side jaw 21 and a nut thread-fastened onto the end of the rearward guide bolt 11, provided with outer threading, penetrating the rearward elongated hole 13.

To secure the mounting unit 1 in position on the chassis of the motor vehicle, a connection web 30 is at an angle, in particular at a right angle, to the side jaw 21. In the depicted embodiment, to increase the stability of the mounting unit 1, a recurved web encompassing the circumference of the side jaw 21 is provided, whose section extending along the topside of the side jaw 21 forms the connection web 30.

Adjoining that end of the setting path of setting unit 2 or of the steering wheel-side end 5, at which the steering spindle 4 has its least length, is a crash path of the setting unit 2 or of the steering wheel-side end 5 of steering spindle 4. Over this crash path, the setting unit 2 or the steering wheel-side end 5 is dislocatable in the event of a vehicle crash, wherein the holding force of the securement device is overcome. Herein, the guide bolts 10, 11 are dislocated over the crash sections 16, 19 of elongated holes 12. 13. Over the crash path, a dislocation of the setting unit 2 or of the steering wheel-side end 5 preferably takes place in direction 8 of the length adjustment. The crash sections 16, 19 thus extend parallel to the longitudinal axis of the section, adjoining the steering wheel-side end 5, of the steering spindle 4 (referring to the position of the setting unit 2 or of that section of the steering spindle 4 which is assumed by the setting unit 2 or by the section of the steering spindle 4 over the crash path). In modified embodiments, discrepancies of the longitudinal reaches of the crash sections 16, 19, compared to the parallel position of the longitudinal axis of the section, adjoining the steering wheel-side end 5, of the steering spindle 4 could also be provided, wherein these discrepancies are preferably less than 20°.

In order for the guide bolts 10, 11 to arrive in the crash sections 16, 19, a stop 31 delimiting the setting path must also be unblocked or overcome, preferably by deformation. In the embodiment according to FIGS. 1 to 4, a lobe, projecting into the rearward elongated hole 13 and forming the stop 31, is bent over by the rearward guide bolt 11.

Figure 9:
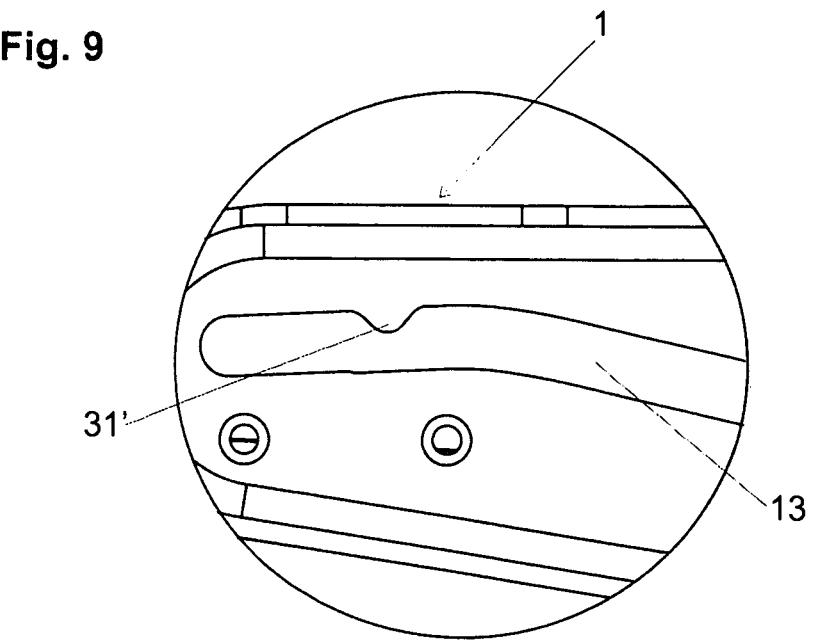
FIG. 9 is an enlarged detail A from FIG. 3 with a modified implementation of the stop at the end of the setting path on which the crash path adjoins.
Figure 10:
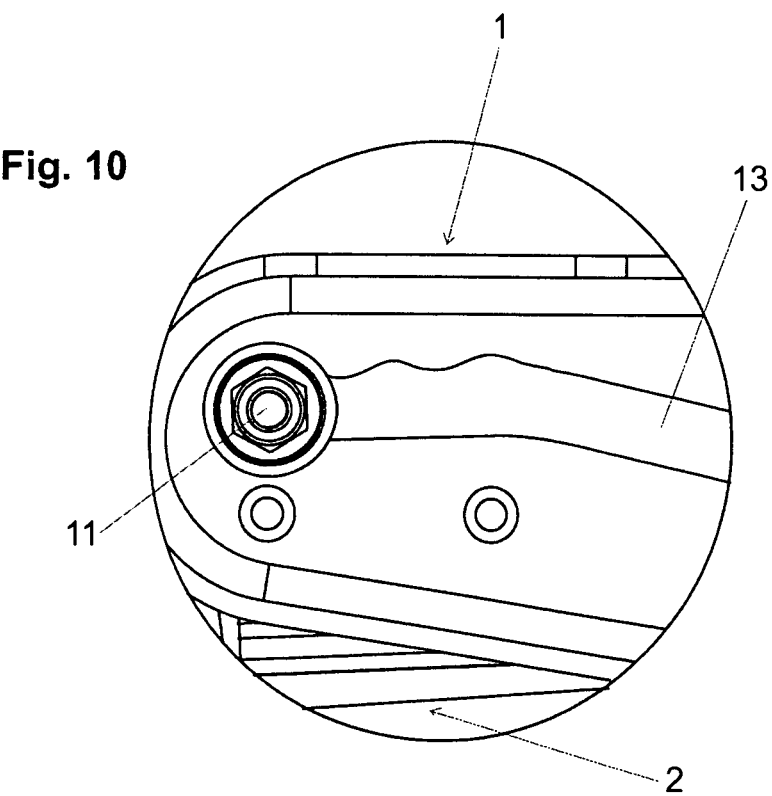
FIG. 10 is the implementation from FIG. 9 after a vehicle crash.

FIGS. 9 and 10 depict an alternative embodiment, in which the stop 31' is formed by a narrowed section of the rearward elongated hole 13, which in the event of a crash is widened by the rearward guide bolt 11.

Such stops 31, 31' could, instead or additionally, be provided for the at least one frontward elongated hole 12. It would also be conceivable and feasible in other embodiments, instead or additionally, to provide one or several, in particular deformable, stops between the mounting unit 1 and setting unit 2.

Advantageously, over the crash path or a portion thereof, additionally to the energy dissipated through the overcoming of the holding force of the securement device 3, energy is dissipated by means of a separate energy absorption mechanism. It can, for example, be provided that the at least one rearward elongated hole 13 and/or the at least one frontward elongated hole 12 in the crash section 19, 16 has a lesser diameter than the rearward or frontward guide bolt 11, 10, and is widened during the dislocation of the guide bolt 11, 10 over the crash section 19, 16.

Figure 8:
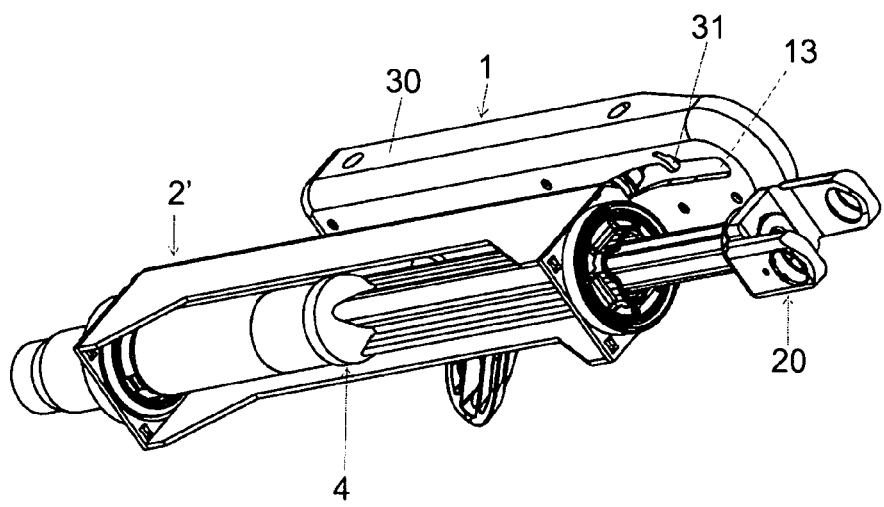
FIG. 8 is an oblique view corresponding to FIG. 7 of a modified embodiment of the setting unit.

FIG. 8 depicts a modified implementation of the setting unit 2'. This is here not implemented as a closed jacket unit but rather as an open bearing unit for the two bearings, disposed at the end side, for the rotatable bearing support of the section of the steering spindle 4 adjoining the steering wheel-side end 5.

LEGEND TO THE REFERENCE NUMBERS

1 Mounting unit
2, 2' Setting unit
3 Securement device
4 Steering spindle
5 Steering wheel-side end
6 Subsection
8 Subsection
8 Direction of length adjustment
9 Direction of height or inclination adjustment
10 Frontward guide bolt
11 Rearward guide bolt
12 Frontward elongated hole
13 Rearward elongated hole
14 Straight section
15 Curved section
16 Crash section
17 Straight section
18 Curved section
19 Crash section
20 Universal joint
21 Side jaw
22 Securement element
23 Outer surface
24 Inner surface
25 Side face
26 Actuation lever
27 Cam disk
28 Link face
29 Spring washer
30 Connection web
31, 31' Stop

The invention claimed is:

1. An adjustable steering column for a motor vehicle, comprising:
   a mounting unit, which can be secured in position on the chassis of the motor vehicle; and
   a setting unit displaceable with respect to the mounting unit, the setting unit being configured to rotatably bearing support a section of the steering spindle, the section adjoining a steering wheel-side end of the steering spindle;
   wherein, during the displacement of the setting unit with respect to the mounting unit, the steering wheel-side end is displaceable between a first end position and a second end position over a setting path;
   wherein over at least a portion of the setting path under coupling, a displacement of the steering wheel-side end in a direction of a length adjustment of the steering column and in a direction of a height or inclination adjustment of the steering column takes place;
   wherein, on the setting unit or on the mounting unit, a frontward guide bolt is secured which engages into at least one frontward elongated hole provided in the other of these two units;
   wherein, on the setting unit or on the mounting unit, a rearward guide bolt is secured, the rearward guide bolt being spaced a greater distance than the frontward guide bolt from the steering wheel-side end of the steering spindle, and the rearward guide bolt engaging into at least one rearward elongated hole provided in the other of the setting unit or the mounting unit, the course of the rearward elongated hole with reference to a curvature and/or direction of reach of the rearward elongated hole, at least over a section of the reach, differs from the corresponding course of the at least one frontward elongated hole.

2. The adjustable steering column as claimed in claim 1, wherein at least one section of the at least one frontward elongated hole is curved, and/or at least one section of the at least one frontward elongated hole extends in a direction which is slanted with respect to the direction of the length adjustment and also with respect to the direction of the height or inclination adjustment.

3. The adjustable steering column as claimed in claim 1, wherein at least one section of the at least one rearward elongated hole is curved, and/or at least one section of the rearward elongated hole extends in a direction which is slanted with respect to the direction of the length adjustment, and also with respect to the direction of the height or inclination adjustment.

4. The adjustable steering column as claimed claim 1, wherein on the frontward guide bolt at least one securement element of a securement device is disposed, and in the opened state of the securement element, the setting unit is displaceable with respect to the mounting unit over the setting path, and the closed state of the securement element, the setting unit is secured nondisplaceably with respect to the mounting unit by the securement element.

5. The adjustable steering column as claimed in claim 4, wherein the securement element is displaced in the direction of the longitudinal axis of the frontward guide bolt during the opening and closing of the securement device.

6. The adjustable steering column as claimed in claim 1, wherein, at least over a portion of the displacement path, the steering wheel-side end of the steering spindle is moved in the direction of the length adjustment and simultaneously rotated about a virtual rotational axis.

7. The adjustable steering column as claimed in claim 6, wherein the virtual rotational axis is spaced a greater distance from the steering wheel-side end of the steering spindle than the rearward guide bolt.

8. The adjustable steering column as claimed in claim 6, wherein the virtual rotational axis is located in the proximity of a universal joint, the universal joint connecting the section adjoining the steering wheel-side end of the steering spindle with a further section of the steering spindle.

9. The adjustable steering column as claimed in claim 1, wherein adjoining the end of the setting path at which the steering spindle has a least amount of length is a crash path over which, in the event of a motor vehicle crash, the steering wheel-side end of the steering spindle is dislocatable, wherein the frontward and the rearward guide bolts are dislocatable in crash sections of the frontward and rearward elongated holes.

10. The adjustable steering column as claimed in claim 9, wherein the crash sections extend in the direction of the length adjustment.

11. The adjustable steering column as claimed in claim 9, wherein at least one stop delimits that end of the setting path in which the steering spindle has a shortest amount of length and in the event of a crash is deformed and is thereby overcome.

12. The adjustable steering column as claimed in claim 11, wherein at least one of the elongated holes includes the at least one stop which reduces the diameter of the elongated hole and which, in the event of a crash, is deformed by guide bolts guided in this elongated hole.

13. The adjustable steering column as claimed in claim 9, wherein at least over a portion of the crash path, an energy absorption mechanism acts to consume energy in addition to that energy which is consumed through the overcoming of the securement device.

14. The adjustable steering column as claimed in claim 13, wherein the energy absorption mechanism acts between at least one of the elongated holes and the guide bolt guided in this elongated hole.

15. The adjustable steering column as claimed in claim 1, wherein, on only one side of the setting unit, a side jaw of the mounting unit extends, and the side jaw carries the setting unit.

\* \* \* \* \*